(12) United States Patent
Sakane

(10) Patent No.: US 8,830,369 B2
(45) Date of Patent: *Sep. 9, 2014

(54) IMAGE SENSOR, DATA OUTPUT METHOD, IMAGE PICKUP DEVICE, AND CAMERA

(75) Inventor: Seijiro Sakane, Kanagawa (JP)

(73) Assignee: Sony Corporation, Tokyo (JP)

( * ) Notice: Subject to any disclaimer, the term of this patent is extended or adjusted under 35 U.S.C. 154(b) by 183 days.

This patent is subject to a terminal disclaimer.

(21) Appl. No.: 13/357,437

(22) Filed: Jan. 24, 2012

(65) Prior Publication Data
US 2012/0120295 A1   May 17, 2012

Related U.S. Application Data

(63) Continuation of application No. 12/429,440, filed on Apr. 24, 2009, now Pat. No. 8,106,986.

(30) Foreign Application Priority Data

May 13, 2008   (JP) .................................. 2008-126140

(51) Int. Cl.
*H04N 5/335*   (2011.01)
*H04N 9/04*   (2006.01)

(52) U.S. Cl.
CPC ............... *H04N 9/045* (2013.01); *H04N 5/335* (2013.01)

USPC .......................................... 348/308; 348/294

(58) Field of Classification Search
CPC ........ H04N 5/335; H04N 9/045; H04N 3/155
USPC ......... 348/272, 273, 281–283, 294, 295, 298, 348/300–308, 311–323; 250/208.1
See application file for complete search history.

(56) References Cited

U.S. PATENT DOCUMENTS

| 7,420,602 B2 * | 9/2008 | Fraenkel et al. ............... 348/294 |
| 8,106,986 B2 * | 1/2012 | Sakane ......................... 348/308 |
| 2004/0227829 A1 | 11/2004 | Wixson et al. |
| 2008/0284886 A1 | 11/2008 | Wakabayashi et al. |

FOREIGN PATENT DOCUMENTS

| JP | 2006-324811 | 11/2006 |
| JP | 2008-048313 | 2/2008 |

* cited by examiner

*Primary Examiner* — Huy K Mai
(74) *Attorney, Agent, or Firm* — Robert J. Depke; The Chicago Technology Law Group, LLC

(57) ABSTRACT

An image sensor includes: a pixel array block configured to get image data by photoelectrically converting light; a register group configured to store information associated with processing of the image sensor; and a parallel interface configured to output the image data to outside in parallel output; wherein the parallel interface further outputs a register value group stored in the register group to outside when the image data is not being outputted to outside.

11 Claims, 9 Drawing Sheets

IMAGE PICKUP DEVICE

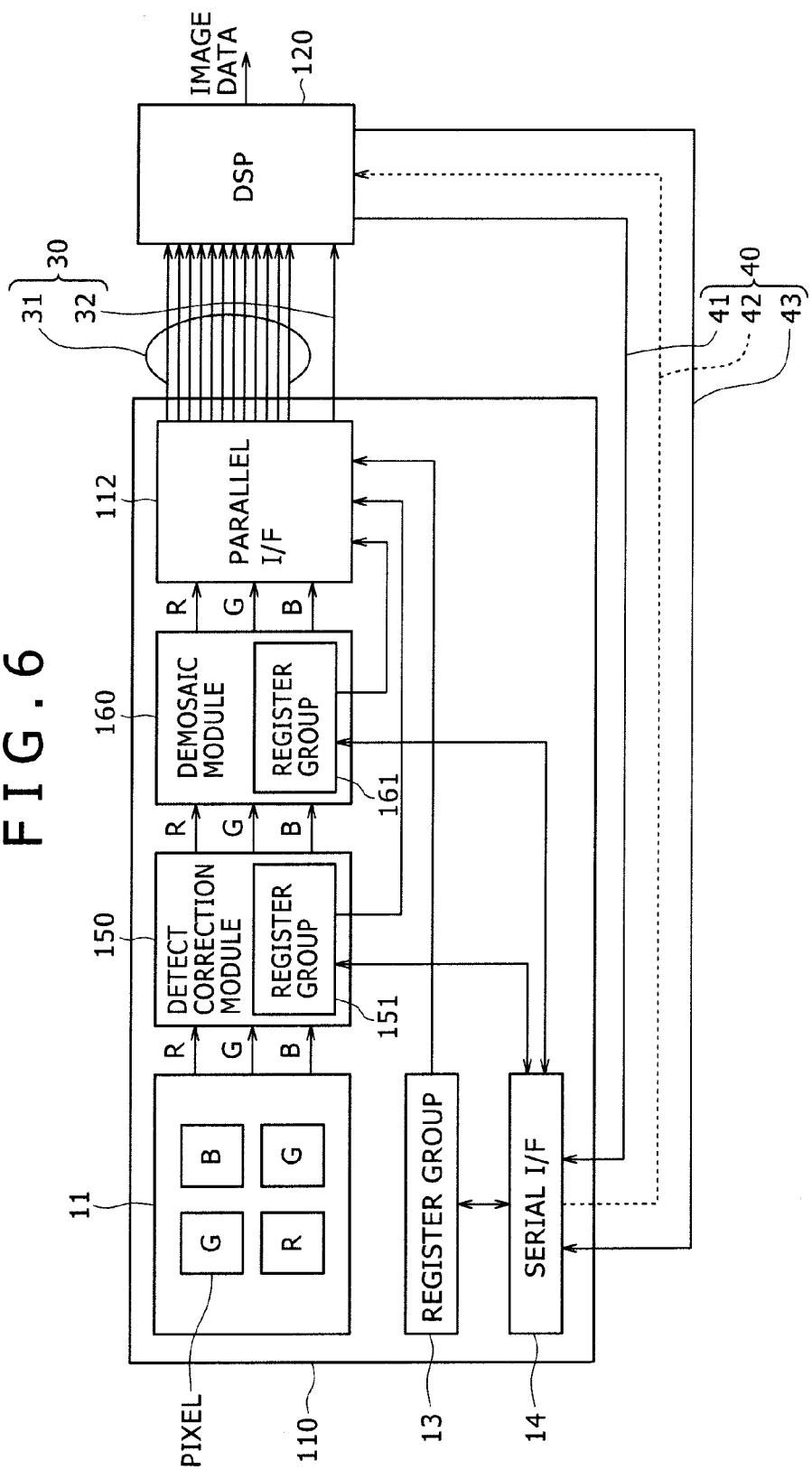

FIG. 7

| IMAGE DATA (FOR 1 SCREEN) | REGISTER VALUE GROUP #1 | REGISTER VALUE GROUP #2 | REGISTER VALUE GROUP #3 | IMAGE DATA (FOR 1 SCREEN) | REGISTER VALUE GROUP #1 | REGISTER VALUE GROUP #2 | REGISTER VALUE GROUP #3 | ... |

IMAGE SENSOR, DATA OUTPUT METHOD, IMAGE PICKUP DEVICE, AND CAMERA

CROSS REFERENCES TO RELATED APPLICATIONS

The subject matter of application Ser. No. 12/429,440, is incorporated herein by reference. The present application is a Continuation of U.S. Ser. No. 12/429,440, filed Apr. 24, 2009, now U.S. Pat. No. 8,106,986, issued Jan. 31, 2012, which claims priority to Japanese Patent Application No. JP 2008-126140 filed in the Japanese Patent Office on May 13, 2008, the entire content of which is hereby incorporated by reference.

BACKGROUND OF THE INVENTION

1. Field of the Invention

The present invention relates to an image sensor, a data output method, an image pickup device, and a camera and, more particularly, to an image sensor, a data output method, an image pickup device, and a camera that are configured to output the information associated with image sensor processing at high speeds without involving a large-scale increase in the size of circuitry.

2. Description of the Related Art

An image pickup device for taking images has an image sensor for outputting image data obtained by photoelectric conversion, such as a CMOS (Complementary Metal Oxide Semiconductor) sensor or the like and a processor for processing the image data, such as a DSP (Digital Signal Processor) or the like, for example.

With the CMOS sensor, image data is outputted (or transmitted) by parallel output to an external DSP, thereby enhancing the transmission efficiency of image data (refer to Japanese Patent Laid-open No. 2008-048313 for example).

Also, the CMOS sensor incorporates a register group configured to store the information inside the CMOS sensor.

The information internal to the CMOS sensor includes various kinds of information associated with the processing that is executed inside the CMOS sensor. The information associated with the processing that is executed inside the CMOS information includes the information for determining the processing that is executed inside the CMOS sensor, such as gain information that is a gain of image data, namely, the information about the amplification rate with which image data is amplified by the CMOS sensor and operation mode information indicative of CMOS sensor operation modes, for example.

The external DSP writes and reads values (hereafter also referred to as a register value group) stored in the register group incorporated in the CMOS sensor in order to monitor and control the CMOS sensor.

To be more specific, the CMOS sensor has a parallel I/F (Interface) configured to output image data in parallel output and a serial I/F configured to execute serial communication, such as two-wire serial communication or three-wire serial communication, with the outside for reading and writing the register value group.

Then, in the CMOS sensor, register value group write and read operations with the DSP are executed in serial communication via the serial I/F.

A CMOS sensor for reading an external register value group in an echoback scheme is known.

In the echoback scheme, when a register value group is written to the CMOS sensor, the register value group so far stored in the register group is outputted from the CMOS sensor in a serial output manner (or echobacked).

It should be noted that, in the echoback scheme, if no write operation to the register group is executed, no register value group is outputted, so that, in order to read the register value group, a proper value must be written to the register group.

Now, referring to FIG. 1, there is shown a block diagram illustrating an exemplary configuration of a related-art image pickup device.

As shown in FIG. 1, an image pickup device has a CMOS sensor 10 and a DSP 20. The CMOS sensor 10 and the DSP 20 are interconnected by both a parallel output line 30 and a serial communication line 40.

The CMOS sensor 10 has a pixel array block 11, a parallel I/F 12, a register group 13, and a serial I/F 14.

The pixel array block 11 has pixels as photoelectric conversion elements arranged in a matrix to photoelectrically convert the light projected thereto, thereby getting image data as an electrical signal.

Image data outputted from the pixel array block 11 is of a Bayer arrangement in which each pixel has one of color signals R (Red), G (Green), and B (Blue) as a pixel value. Namely, the arrangement of the pixels (or color filters not shown) of the pixel array block 11 is of the Bayer arrangement.

The pixel value of each pixel as the image data obtained by the pixel array block 11 is fast outputted to the parallel I/F 12 via a 10-bit parallel bus and an 8-channel serial bus, for example.

The parallel I/F 12 receives the image data from the pixel array block 11 and outputs the received image data to the outside of the CMOS sensor 10, namely, the external DSP 20 in this case in parallel output.

It should be noted that the parallel I/F 12 and the DSP 20 are interconnected by the parallel output line 30.

The parallel output line 30 has an image data output line 31 and a parallel clock line 32.

The image data output line 31 is 12 signal lines of LVDS (Low Voltage Differential Signaling), for example. The parallel I/F 12 transmits (or outputs) the pixel value of each pixel as image data to the DSP 20 in parallel output via the image data output line 31 by a differential signal having an amplitude of several 100 mV to approx. 350 mV.

The parallel clock line 32 is a signal line for transmitting a clock of 480 MHz of LVDS, for example. The parallel I/F 12 supplies (or outputs) the clock of 480 MHz of LVDS to the DSP 20 via the parallel clock line 32.

The DSP 20 receives the image data transmitted via the image data output line 31, in synchronization with a clock supplied via the parallel clock line 32, and executes necessary processing on the received image data, outputting the processed image data. The processing to be executed by the DSP 20 includes hand-shake cancellation and image data dynamic range expansion, for example.

On the other hand, in the CMOS sensor 10, the register group 13 stores information internal to the CMOS sensor 10.

Writing a register value (group) to the register group 13 is executed by the CMOS sensor 10 itself without an instruction from the outside or in accordance with an instruction given from the outside.

Namely, the CMOS sensor 10 writes OPB (OPtical Black) information indicative of an optical black level that is provided when image data is obtained by photoelectric conversion to the register group 13, for example.

Also, the register group 13 stores gain information in accordance with an instruction given from the external DSP 20, for example.

The information (or the register value group) stored in the register group 13 is referenced as demanded inside the CMOS sensor 10 to be used for determining processing (or contents thereof) to be executed in the CMOS sensor 10, for example. Namely, in the pixel array block 11, the image data is multiplied by a gain indicated by gain information stored in the register group 13, for example.

Also, the information stored in the register group 13 is read by the external DSP 20 as demanded.

Writing or reading information supplied from the external DSP 20 to or from the register group 13 is executed via the serial I/F 14.

Namely, the serial I/F 14 and the DSP 20 are interconnected by the serial communication line 40.

The serial communication line 40 is a signal line for executing 3-wire serial communication and has a register write line 41, a register read line 42, and a serial clock line 43.

The register write line 41 is a signal line that is used for writing information from the outside to the register group 13. The DSP 20 transmits the information to be written to the register group 13 to the serial I/F 14 in serial communication via the register write line 41. the serial I/F 14 receives the signal transmitted from the DSP 20 via the register write line 41 and writes the received signal to the register group 13.

The register read line 42 is a signal line that is used for reading information (or a register value group) stored in the register group 13 to the outside. When a register value (group) is requested by the DSP 20 via the serial communication line 40, the serial I/F 14 reads the requested register value group from the register group 13 and transmits the register value group to the DSP 20 via the register read line 42.

The serial clock line 43 is a signal line that is used for transmitting the clock for passing register value groups between the serial I/F 14 and the DSP 20 via the register write line 41 and the register read line 42. The external DSP 20 supplies (or outputs) a clock of several kHz to several 10 MHz to the serial I/F 14 via the serial clock line 43.

The passing of register value groups between the serial I/F 14 and the DSP 20 is executed in synchronization with the clock on the serial clock line 43.

SUMMARY OF THE INVENTION

As described above, reading information from the register group 13 of the CMOS sensor 10 to the DSP 20 is executed in synchronization with the clock as slow as several kHz to several 10 MHz by serial communication by use of one register read line 42.

On the other hand, in recent years, various kinds of information internal to the CMOS sensor 10 are demanded in order to execute various kinds of monitoring and the line on the CMOS sensor 10 by the DSP 20 arranged behind the CMOS sensor 10. This demand promoted the development of CMOS sensors that are configured to output various kinds of internal information to the outside.

However, if the reading of many items of internal information (or register value groups) from the CMOS sensor 10 in the serial communication such as described above, it will take time for reading register value groups. Therefore, if the processing is executed in response to a register value group in the DSP 20 at the later stage, the time demanded for reading register value groups will result in delayed processing.

In order to solve this problem, an I/F for high-speed parallel output may be newly arranged to execute the reading of register value groups from the CMOS sensor 10 via the newly arranged I/F.

However, the new arrangement of such an I/F on the CMOS sensor 10 increases the circuit scale of the CMOS sensor 10.

It should be noted that, if the serial I/F 14 is changed to the I/F for parallel output, the CMOS sensor 10 will lose so-called upward compatibility.

Therefore, the present embodiment addresses the above-identified and other problems associated with related-art methods and apparatuses and solves the addressed problems by providing an image sensor, a data output method, an image pickup device, and a camera that are configured to output the information associated with the processing of an image sensor, such as a CMOS sensor, to the outside at high speeds without involving an increased circuit scale.

In carrying out a first embodiment of the present invention, there is provided an image sensor. This image sensor has a pixel array block configured to get image data by photoelectrically converting light; a register group configured to store information associated with processing of the image sensor; and a parallel interface configured to output the image data to outside in parallel output, wherein the parallel interface further outputs a register value group stored in the register group to outside when the image data is not being outputted to outside.

A data output method according to the first embodiment of the invention has the step of outputting, to outside, by a parallel interface of an image sensor, a register value group stored in a register group when image data is not being outputted to outside, the image sensor having a pixel array block configured to get the image data by photoelectrically converting light, the register group configured to store information about processing of the image sensor, and the parallel interface configured to output the image data to outside in parallel output.

In the first embodiment of the invention described above, the parallel interface configured to output the image data to outside in parallel output further outputs a register value group stored in the register group to outside when the image data is not being outputted to outside.

In carrying out a second embodiment of the present invention, there is provided an image pickup device. This image pickup device has an image sensor configured to output image data; and a processor configured to receive the image data outputted from the image sensor. The image sensor has a pixel array block configured to get the image data by photoelectrically converting light, a register group configured to store information about processing of the image sensor, and a parallel interface configured to output the image data to outside in parallel output. In this image pickup device, the parallel interface further outputs a register value group stored in the register group to outside when the image data is not being outputted to outside and the processor receives the image data and the register value group outputted from the parallel interface.

As described above, in the second embodiment of the invention, the parallel interface configured to output the image data to outside in parallel output further outputs a register value group stored in the register group to outside when the image data is not being outputted to outside. Then, the processor receives the image data and the register value group outputted from the parallel interface.

In carrying out a third embodiment of the present invention, there is provided a camera. This camera has an optical system; an image sensor configured to output image data; and a processor configured to receive the image data outputted from the image sensor. In this configuration, the image sensor has a pixel array block configured to get image data by photoelectrically converting light from the optical system, a register group configured to store information associated with processing of the image sensor, and a parallel interface configured to output the image data to outside in parallel output, the parallel interface further outputs, to outside, a register value group stored in the register group when the image data is not being outputted to outside and the processor receives the image data and the register value group outputted from the parallel interface.

In the third embodiment of the invention as described above, the parallel interface configured to output the image data to outside in parallel output further outputs a register value group stored in the register group to outside when the image data is not being outputted to outside. Then, the processor receives the image data and the register value group outputted from the parallel interface.

It should be noted that the image sensor, the image pickup device, and the camera may each be a standalone apparatus or internal blocks constituting one unit of apparatus.

Namely, the camera, for example, may be a standalone camera product or a camera unitized with a mobile phone or a PC (Personal Computer).

According to the first, second, and third embodiments of the invention, the information associated with the processing by the image sensor can be outputted to the outside at high speeds without involving an increased circuit scale.

BRIEF DESCRIPTION OF THE DRAWINGS

FIG. 6 is a block diagram illustrating an exemplary configuration of the CMOS sensor practiced as another embodiment of the present invention;

FIG. 7 is a data format that is outputted by the parallel I/F;

DETAILED DESCRIPTION OF THE PREFERRED EMBODIMENTS

This invention will be described in further detail by way of embodiments thereof with reference to the accompanying drawings. Now, referring to FIG. 2, there is shown a block diagram illustrating an image pickup device practiced as one embodiment of the present invention.

Figure 1:
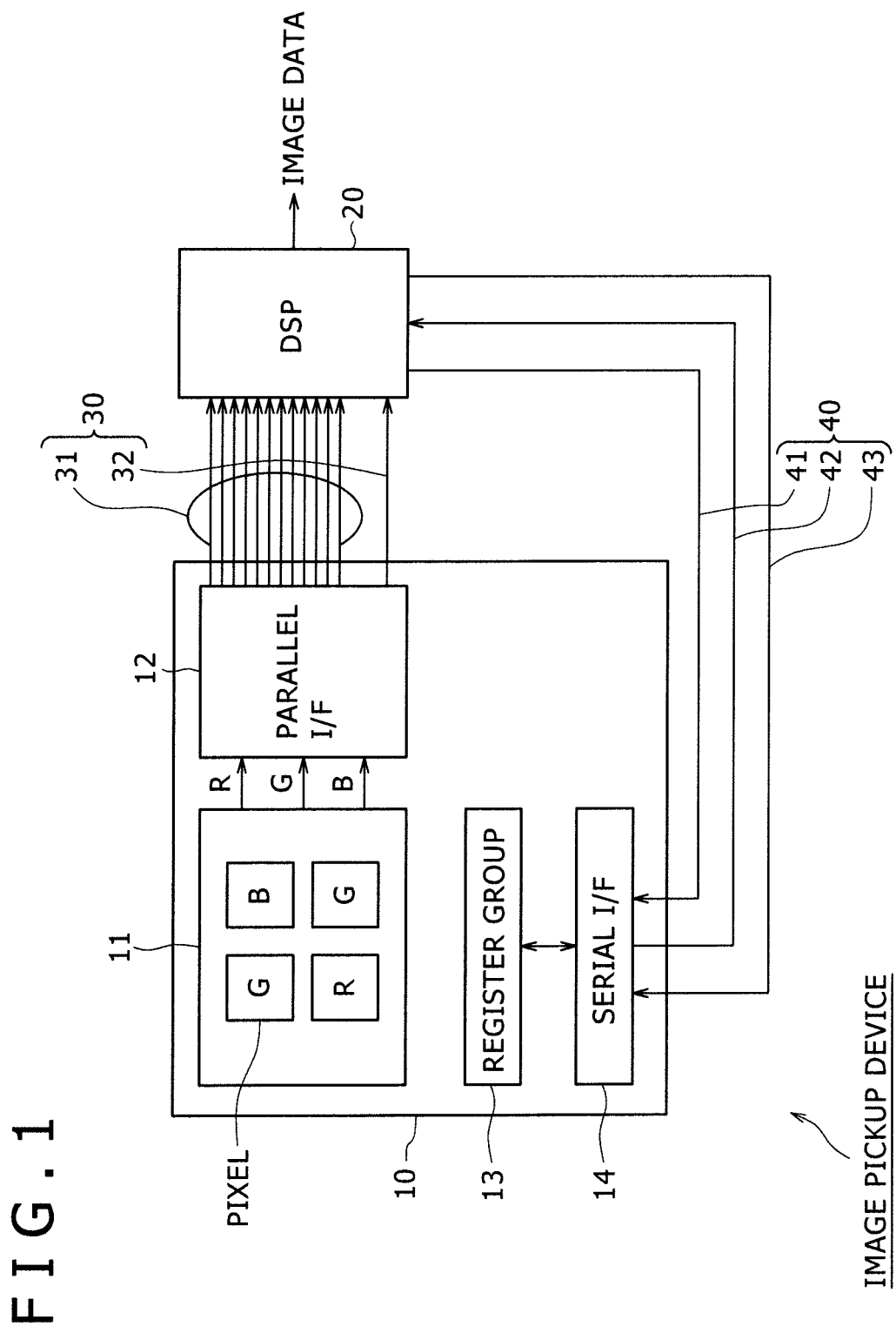
FIG. 1 is a block diagram illustrating an exemplary configuration of a related-art image pickup device.

It should be noted that, with reference to FIG. 2, components similar to those previously described with reference to FIG. 1 are denoted by the same reference numerals the description thereof will be appropriately skipped.

The image pickup device is a device having an image sensor that outputs image data obtained by photoelectric conversion and a processor that processes the image data.

Figure 2:
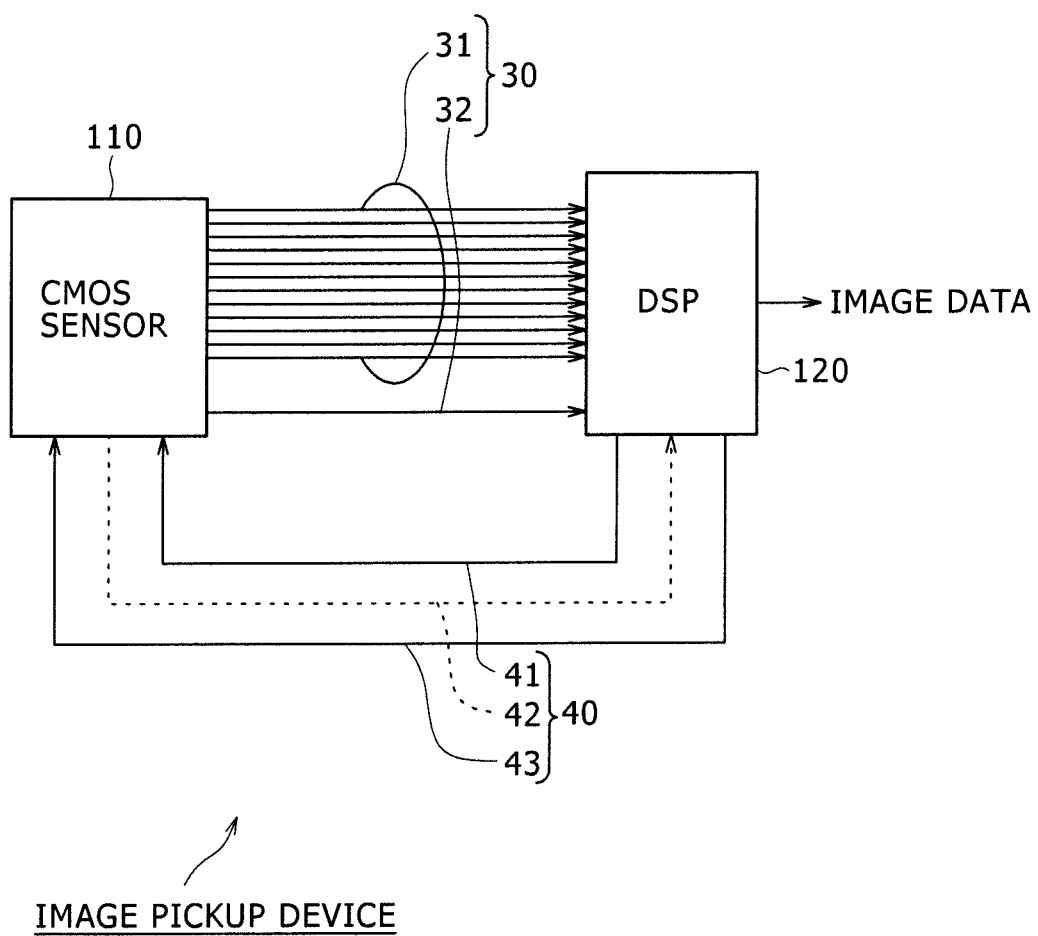
FIG. 2 is a block diagram illustrating an exemplary configuration of an image pickup device practiced as one embodiment of the present invention.

In FIG. 2, the image pickup device is substantially the same as that shown in FIG. 1 in that a CMOS sensor 110 and a DSP 120 are interconnected by a parallel output line 30 and a serial communication line 40, while the CMOS sensor 10 and the DSP 20 are interconnected by the parallel output line 30 and the serial communication line 40.

However, with reference to FIG. 2, the image pickup device is different from the image pickup device shown in FIG. 1 in that the image pickup device shown in FIG. 2 has the CMOS sensor 110 and the DSP 120 while the image pickup device shown in FIG. 1 has the CMOS sensor 10 and the DSP 20.

The CMOS sensor 110 is one example of image sensor that outputs image data. The CMOS sensor 110 gets image data by photoelectrically converting the light entering the CMOS sensor 110 and outputs the obtained image data to the outside via the parallel output line 30.

In addition to image data, the CMOS sensor 110 outputs a register value group that is information internal to the CMOS sensor 110 via the parallel output line 30.

The DSP 120 is one example of a processor that receives the image data outputted by the image sensor. The DSP 120 receives the image data outputted by the CMOS sensor 110 via the parallel output line 30, executes necessary processing on the received image data, and outputs the processed image data.

Further, the DSP 120 also receives a register value group that is outputted by the CMOS sensor 110 via the parallel output line 30. This register value group is used for the processing to be executed by the DSP 120 as demanded.

The CMOS sensor 110 and the DSP 120 are interconnected by not only the parallel output line 30 but also the serial communication line 40.

Then, the DSP 120 writes a register value group to the CMOS sensor 110 via a register write line 41 of the serial communication line 40.

In order to provide the upward compatibility with the CMOS sensor 10 shown in FIG. 1, the CMOS sensor 110 is configured to output a register value group to the outside via a register read line 42 of the serial communication line 40.

Namely, as described above, the CMOS sensor 110 outputs a register value group to the outside via the parallel output line 30; at the same time, the CMOS sensor 110 is also enabled to output a register value group to the outside via the serial communication line 40.

It should be noted that, if there is no need for providing the upward compatibility with the CMOS sensor 10 shown in FIG. 1, the CMOS sensor 110 may be configured not to output a register value group to the outside via the register read line 42 of the serial communication line 40. In this case, the serial communication line 40 may be configured without arranging the register read line 42 indicated by dashed lines.

Figure 3:
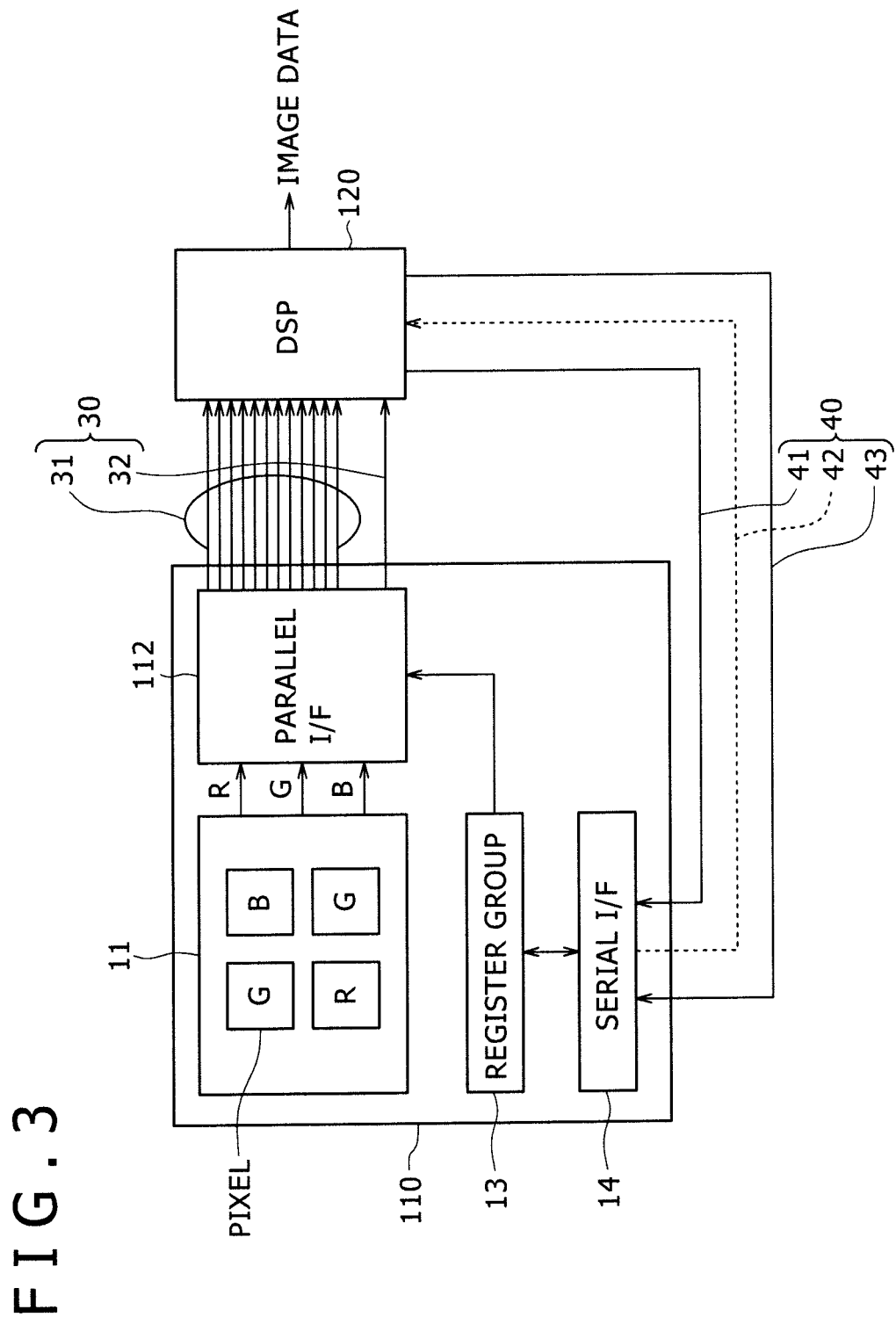
FIG. 3 is a block diagram illustrating an exemplary configuration of a CMOS sensor.

Referring to FIG. 3, there is shown an exemplary configuration of the CMOS sensor 110 shown in FIG. 2.

It should be noted that, with reference to FIG. 3, components similar to those of the CMOS sensor 10 shown in FIG. 1 previously described with reference to FIG. 1 are denoted by the same reference numerals and the description thereof will be appropriately skipped.

Namely, the CMOS sensor 110 is common to the CMOS sensor 10 shown in FIG. 1 in that the CMOS sensor 110 has a pixel array block 11, a register group 13, and a serial I/F 14.

However, the CMOS sensor 110 differs from the CMOS sensor 10 shown in FIG. 1 in that the CMOS sensor 110 has a parallel I/F 112 instead of the parallel I/F 12.

The parallel I/F 112 is supplied with a register value group stored in the register group 13 in addition to the image data that is outputted from the pixel array block 11.

The parallel I/F 112 is connected to the DSP 120 via the parallel output line 30 and, like the parallel I/F 12 shown in FIG. 1, transmits (or outputs) the pixel value of each pixel as the image data from the pixel array block 11 to the DSP 120 in parallel output via the parallel output line 30.

Further, the parallel I/F 112 transmits (or outputs) a register value group stored in the register group 13 to the external DSP 120 in parallel output via the parallel output line 30 when no image data is being outputted to the outside.

No image data is being outputted by the parallel I/F 112 to the outside in horizontal blanking interval or vertical blanking interval, for example.

It should be noted that, like the DSP 20 shown in FIG. 1, the DSP 120 receives image data transmitted from the parallel I/F 112 via the parallel output line 30 and executes necessary processing on the received image data, outputting the processed image data. The processing to be executed by the DSP 120 includes hand-shake correction and image data dynamic range expansion, for example.

In addition, the DSP 120 receives a register value group transmitted from the parallel I/F 112 via the parallel output line 30. The DSP 120 monitors the register value group from the parallel I/F 112 and executes control on the CMOS sensor 110 for example as demanded.

Figure 4:
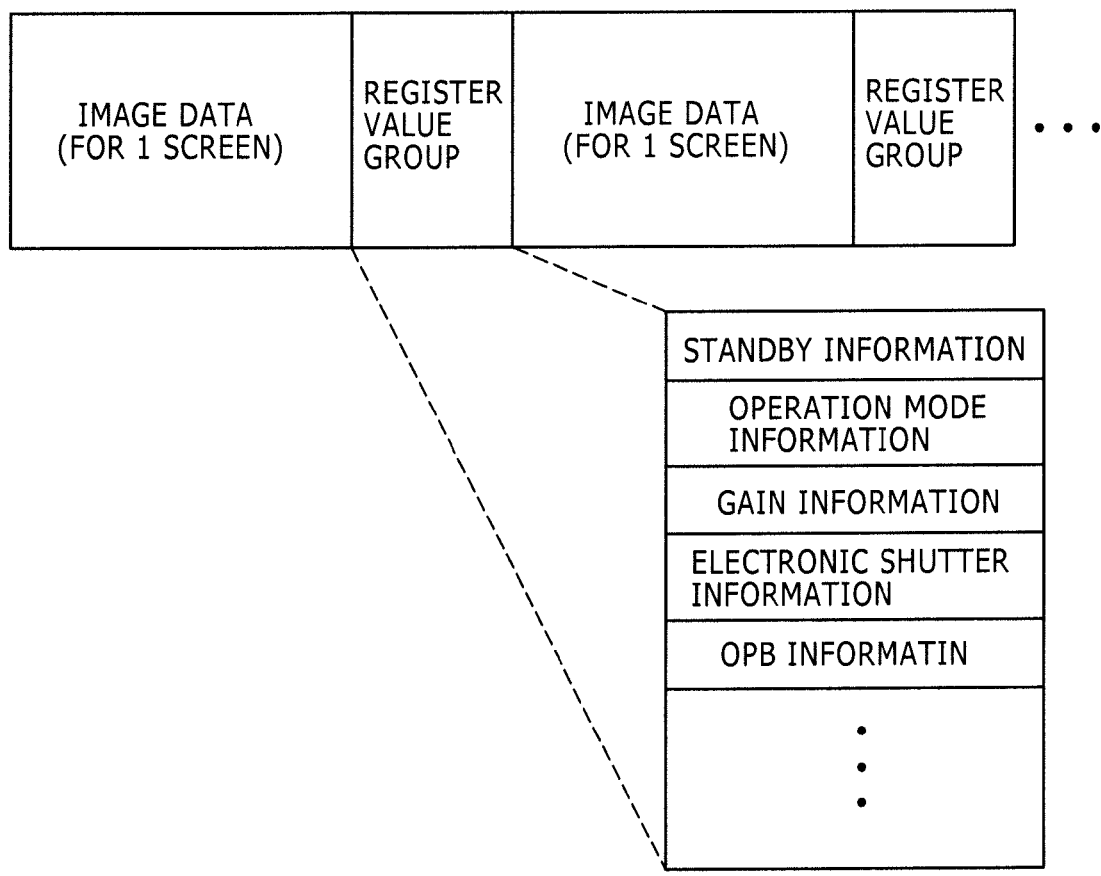
FIG. 4 is a data format that is outputted by a parallel I/F.

FIG. 4 shows a format of data (hereafter referred to also as parallel data) that is outputted from the parallel I/F 112 via the parallel output line 30.

The parallel I/F 112 outputs a register value group in synchronization with image data for one screen that is one field or one frame, for example.

Namely, the parallel I/F 112 outputs a register value group during one blanking interval, that is, between the end of output of image data for one screen and the start of output of next image data for one screen, for example.

For the register value group that is outputted from the parallel I/F 112 in synchronization with image data for one screen during a vertical blanking interval immediately following that image data for one screen, a register value group stored in the register group 13 when that image data for one screen was obtained in the pixel array block 11 may be used, for example.

Thus, by outputting a register value group at the time the image data for one screen was obtained in the pixel array block 11 in synchronization with the data for one screen in the parallel I/F 112, the DSP 120 can get collectively the information associated with the processing for obtaining the image data for one screen that was executed inside the CMOS sensor 110.

Namely, the DSP 120 can collectively obtain parameters and so on for determining an operation of the CMOS sensor 110 that were set when the processing for obtaining the image data for one screen was executed in the CMOS sensor 110, for example.

The register value group that is outputted by the parallel I/F 112 in synchronization with the image data for one screen includes standby information, operation mode information, gain information, electronic shutter information, OPB information, and so on, for example as shown in FIG. 4.

The standby information is indicative whether the CMOS sensor 110 is in a low power dissipation mode or not. The operation mode information is indicative of a mode of binning (for example, whether or not an added value of pixel values of adjacent 2×2 pixels is outputted as the pixel value of one pixel) (of the pixel array block 11) of the CMOS sensor 110.

The gain information is indicative of a gain (or an amplification rate at amplifying image data (or pixel values) in the pixel array block 11) of the image data that is outputted by the pixel array block 11. The electronic shutter information is indicative of a state (how wide the electronic shutter is open, which is equivalent to an aperture state) of the electronic shutter of the pixel array block 11. The OPB information is indicative of a level of optical black.

It should be noted that the register value group that is outputted by the parallel I/F 112 in synchronization with the image data for one screen may be one register value or a plurality of register values including all register value groups stored in the register group 13.

The register value groups that are outputted from the parallel I/F 112 can be controlled (or specified) by writing a predetermined register value to the register group 13 from the DSP 120 via the serial communication line 40, for example.

Also, whether a register value group is to be outputted from the parallel I/F 112 via the parallel output line 30 or from the serial I/F 14 via the serial communication line 40 can be controlled by writing a predetermined register value to the register group 13 from the DSP 120 via the serial communication line 40.

It should be note that, as shown in FIG. 4, if a register value group is outputted during a vertical blanking interval in the parallel I/F 112, the data amount of the register value group is limited to a data amount that can be outputted (or transmitted) in parallel output during the vertical blanking interval.

Figure 5A:
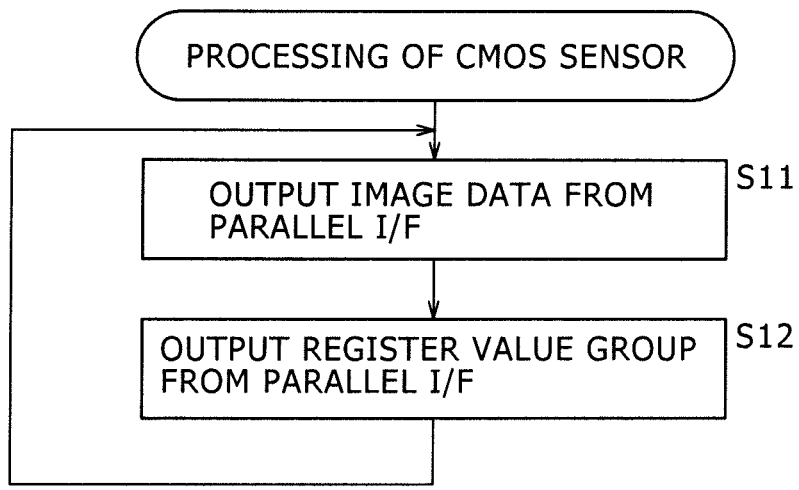
FIG. 5A and FIG. 5B are flowcharts indicative of processing by the image pickup device.
Figure 5B:
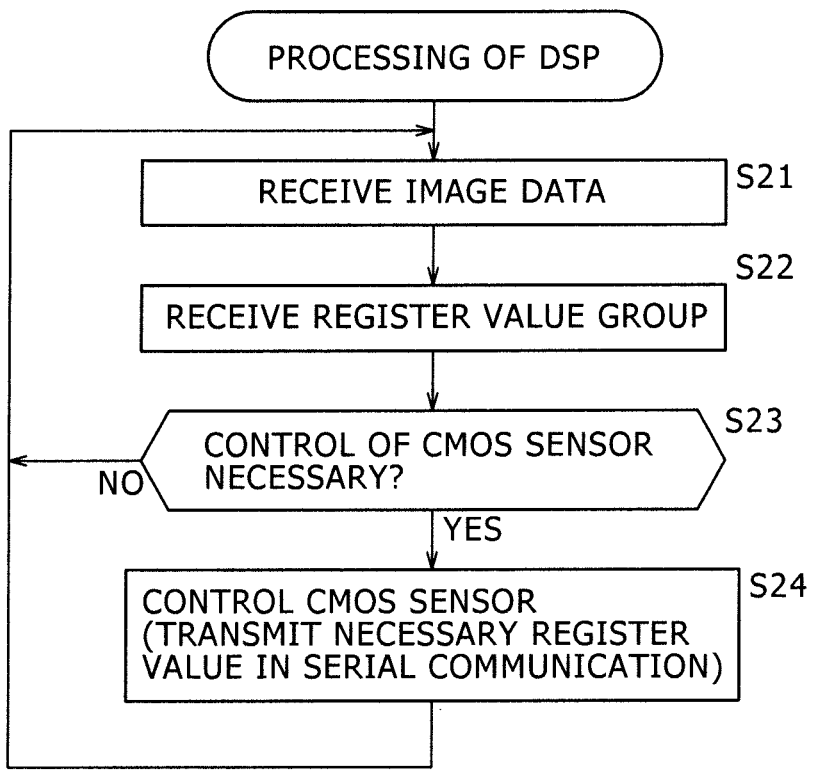

The following describes processing (or operations) of the image pickup device shown in FIG. 2 with reference to FIGS. 5A and 5B.

FIG. 5A is a flowchart indicative of processing to be executed by the CMOS sensor 110 shown in FIG. 2.

In the CMOS sensor 110, the pixel array block 11 photoelectrically converts the light entered therein into image data that is an electrical signal, which is then outputted.

The image data outputted from the CMOS sensor 110 is supplied to the parallel I/F 112.

Receiving the image data from the CMOS sensor 110, the parallel I/F 112 outputs the received image data to the DSP 120 in parallel output via the parallel output line 30 in step S11.

When the output of the image data for one frame for example as one screen has been completed in the parallel I/F 112, namely, when a vertical blanking interval has been entered, for example, the procedure goes from step S11 to step S12, upon which the parallel I/F 112 outputs a register value group stored in the register group 13, namely, a register value group at the time the image data for one frame transmitted immediately before was obtained by the pixel array block 11, for example, to the DSP 120 in parallel output via the parallel output line 30.

Therefore, in the parallel I/F 112, the register value group stored in the register group 13 is outputted to the outside in parallel output when the image data is not being outputted to the outside.

As described above, a register value group stored in the register group 13 is outputted to the outside in parallel output when the image data is not being outputted to the outside, so that the information associated with the processing of the CMOS sensor 110 can be outputted to the outside at high speeds without increasing the circuit scale.

Consequently, the external DSP 120 can get many register value groups in a relatively short time as compared with the case where register value groups are read by (low-speed) serial communication that is executed via the serial communication line 40.

When the pixel array block 11 starts outputting the image data of a next one frame upon completion of the output of a register value group stored in the register group 13 and the completion of the vertical blanking interval, the procedure returns from step S12 to step S11, in which the CMOS sensor 110 repeats the above-mentioned processing.

FIG. 5B shows a flowchart indicative of the processing of the DSP 120 shown in FIG. 2.

The DSP 120 waits for the transmission (or output) of the image data from the parallel I/F 112 of the CMOS sensor 110 via the parallel output line 30 and receives the image data in step S21.

When the DSP 120 have received the image data for one frame, the procedure goes from step S21 to step S22, in which the DSP 120 receives the register value group transmitted (or outputted) by the parallel I/F 112 in synchronization with the image data, namely, the register value group transmitted during the vertical blanking interval immediately after the image data of one frame received immediately before and that image data of one frame is obtained in the pixel array block 11. Then, the procedure goes to step S23.

As described above, the DSP 120 receives the register value group transmitted from the CMOS sensor 110 in parallel output, so that the DSP 120 need not read register value groups from the CMOS sensor 110 in serial communication.

In step S23, the DSP 120 determines on the basis of the register value group received in step S22 whether it is necessary to control the CMOS sensor 110.

If control of the CMOS sensor 110 is found not to be necessary in step S23, the procedure skips step S24 and returns to step S21. In step S21, the DSP 120 waits for the transmission of the image data of next one frame from the parallel I/F 112 and receives the image data, repeating the above-mentioned processing therefrom.

On the other hand, if control of the CMOS sensor 110 is found to be necessary in step S23, then the procedure goes to step S24, in which the DSP 120 executes a necessary control operation on the CMOS sensor 110 on the basis of the register value group received in step S22.

Namely, the DSP 120 transmits a necessary register value in serial communication via the serial communication line 40 to write the register value to the register group 13, thereby controlling the CMOS sensor 110.

To be more specific, if a register value group received by the DSP 120 from the CMOS sensor 110 includes gain information, for example, and, if that gain information is below a predetermined threshold, namely, the image data is relatively dark, it is determined that the gain of the CMOS sensor 110 need to be controlled in step S23.

Then, in step S24, the DSP 120 controls the CMOS sensor 110 such that gain information indicative of a gain greater than a current gain (a gain indicated by gain information included in a register value group received in step S22) by a predetermined value, for example, is written to the register group 13 in serial communication, thereby increasing the gain of the CMOS sensor 110.

As described above, in the image pickup device shown in FIG. 2, register value groups outputted by the CMOS sensor 110 in synchronization with image data may be used as the information (or reference) for applying feedback to the CMOS sensor 110 (or controlling the CMOS sensor 110).

After step S24, the procedure returns to step S21 to repeat the above-mentioned processing therefrom.

Referring to FIG. 6, there is shown another exemplary configuration of the CMOS sensor 110 shown in FIG. 2.

It should be noted that, with reference to FIG. 6, components similar to those previously described with reference to FIG. 3 are denoted by the same reference numerals and the description thereof will be appropriately skipped.

Namely, in FIG. 6, a CMOS sensor 110 is substantially the same as that shown in FIG. 3 in a pixel array block 11, a register group 13, a serial I/F 14, and a parallel I/F 112.

However, the CMOS sensor 110 shown in FIG. 6 differs from that shown in FIG. 3 in the arrangement of a detect correction module 150 and a demosaic module 160 between the pixel array block 11 and the parallel I/F 112.

Namely, the CMOS sensor 110 shown in FIG. 6 has a configuration of SoC (System on a Chip) in which the defect correction module 150 that is one example of an image processing module for executing image processing on image data and the demosaic module 160 are incorporated.

The defect correction module 150 is supplied with image data outputted from the pixel array block 11. The defect correction module 150 executes so-called detection correction on pixels as the image processing for the image data outputted from the pixel array block 11 and supplies the corrected image data to the demosaic module 160.

It should be noted that the defect correction module 150 has a register group 151 separate from the register group 13, the register group 151 storing information associated with detect correction that is executed in the defect correction module 150.

The defect correction module 150 references register values (groups) stored in the register group 151 to execute defect correction. Also, the defect correction module 150 writes information (a register value or group) necessary for detection correction to the register group 151.

Namely, the defect correction module 150 detects a defective pixel and corrects the pixel value of the detected defective pixel, for example. Further, after detecting a defective pixel, the defect correction module 150 writes information about the detected defective pixel to the register group 151. Then, as demanded, the defect correction module 150 references information about a defective pixel included in a register value group stored in the register group 151 to identify a defective pixel from among the pixels in the image data transmitted from the pixel array block 11, thereby correcting the pixel value of that defective pixel.

Further, if the defect correction module 150 executes the detection of defective pixels by use of predetermined threshold value, for example, namely, if the defect correction module 150 executes the detection of defective pixels by making a comparison between the pixel value of a pixel in the image data transmitted from the pixel array block 11 and the predetermined threshold value, the defect correction module 150 references the register value group stored in the register group 151 to recognize the predetermined threshold value for use in the detection of defective pixels.

Namely, as with the register group 13, information read and write operations can be made on the register group 151 by executing serial communication with the external DSP 120 by the serial I/F 14.

For example, the DSP 120 executes a write operation on the register group 151 by transmitting a predetermined threshold value to the serial I/F 14 in serial communication via the serial communication line 40.

The defect correction module 150 references the predetermined threshold value written to the register group 151 as described above for example, thereby executing defective pixel detection.

The demosaic module 160 is supplied with image data from the defect correction module 150. The demosaic module 160 executes demosaic processing as image processing on image data supplied from the defect correction module 150 and supplies the processed image data to the parallel I/F 112.

It should be noted that the demosaic module 160 has a register group 161 that is separate from the register group 13, the register group 161 storing information associated with demosaic processing that is executed in the demosaic module 160.

The demosaic module 160 references a register value (group) stored in the register group 161 to execute demosaic processing. Also, the demosaic module 160 writes information (a register value (group)) necessary for demosaic processing to the register group 161.

Namely, the demosaic module 160 executes demosaic processing in which image data supplied from the pixel array block 11 via the defect correction module 150, the image data having one of color signals R, G, and B as a pixel value for each pixel, is converted into a image data having all of R, G, and B color signals as a pixel value for each pixel.

In the demosaic processing, a color signal having no pixel as a pixel value is obtained by weighted addition or the like as an interpolation using the pixel values of other two or more pixels, for example.

For example, the demosaic module 160 obtains, in executing interpolation, a weight for use in weighted addition on the basis of a distance between a pixel on which a color signal is obtained and a pixel for use in interpolation. Further, the demosaic module 160 writes information about a weight for use in weighted addition to the register group 161. Next, the demosaic module 160 references the weight information included in a register value group stored in the register group 161 as demanded, executing interpolation on the basis of this weight.

As with the register group 13, information read and write operations can be made on the register group 161 by executing serial communication with the external DSP 120 by the serial I/F 14.

For example, the DSP 120 transmits the weight information to the serial I/F 14 for use in interpolation in serial communication via the serial communication line 40, writing the weight information to the register group 161, for example.

The demosaic module 160 references the weight information written to the register group 161 as described for example and uses that weight to execute interpolation.

It should be noted that, in FIG. 6, the parallel I/F 112 transmits a register value group stored in the register group 13 to the DSP 120 in parallel output via the parallel output line 30 when image data is not being outputted to the outside and also transmits a register value group stored in the register group 151 or the register group 161 as other register groups to the DSP 120 in the same manner.

Referring to FIG. 7, there is shown a format of data (parallel data) that is outputted by the parallel I/F 112 shown in FIG. 6 via the parallel output line 30.

As shown in FIG. 7, the parallel I/F 112 outputs, in synchronization with image data of one frame for example for one screen, register value groups stored in the register groups 13, 151, and 161 onto the parallel output line 30 during a vertical blanking interval, for example, that is an interval in which no image data is being outputted to the parallel output line 30, thereby transmitting the register value groups to the DSP 120.

In FIG. 7, register value group #1 is a register value group stored in the register group 13, register value group #2 is a register value group stored in the register group 151, and register value group #3 is a register value group stored in the register group 161.

The register value groups to be outputted by the parallel I/F 112 in synchronization with image data for one frame include register value groups stored in the register group 13 when the image data for one frame was obtained in the pixel array block 11, register value groups stored in the register group 151 when the image data for one frame was processed (defect-corrected) in the defect correction module 150, and register value groups stored in the register group 161 when the image data for one frame was processed (demosaiced) in the demosaic module 160, for example.

Thus, by outputting, in synchronization with the image data for one frame in the parallel I/F 112, the register value groups at the time the image data for one frame was processed in the CMOS sensor 110, the DSP 120 can integrally (or collectively) get the information (or the register value groups) associated with the processing (the processing executed in the pixel array block 11, the defect correction module 150, and the demosaic module 160) on the image data for one frame executed in the CMOS sensor 110.

Namely, the DSP 120 can collectively get the parameters and so on for determining the operations (including the operations of the defect correction module 150 and the demosaic module 160) of the CMOS sensor 110 that were set when the processing for the image data for one frame was executed in the CMOS sensor 110, for example.

As described above, if, in synchronization with image data for one frame, the parallel I/F 112 outputs a register value group at the time the image data for one frame was processed in the CMOS sensor 110, the DSP 120 can relate the image data for one frame with the register value group for storage.

Figure 8:
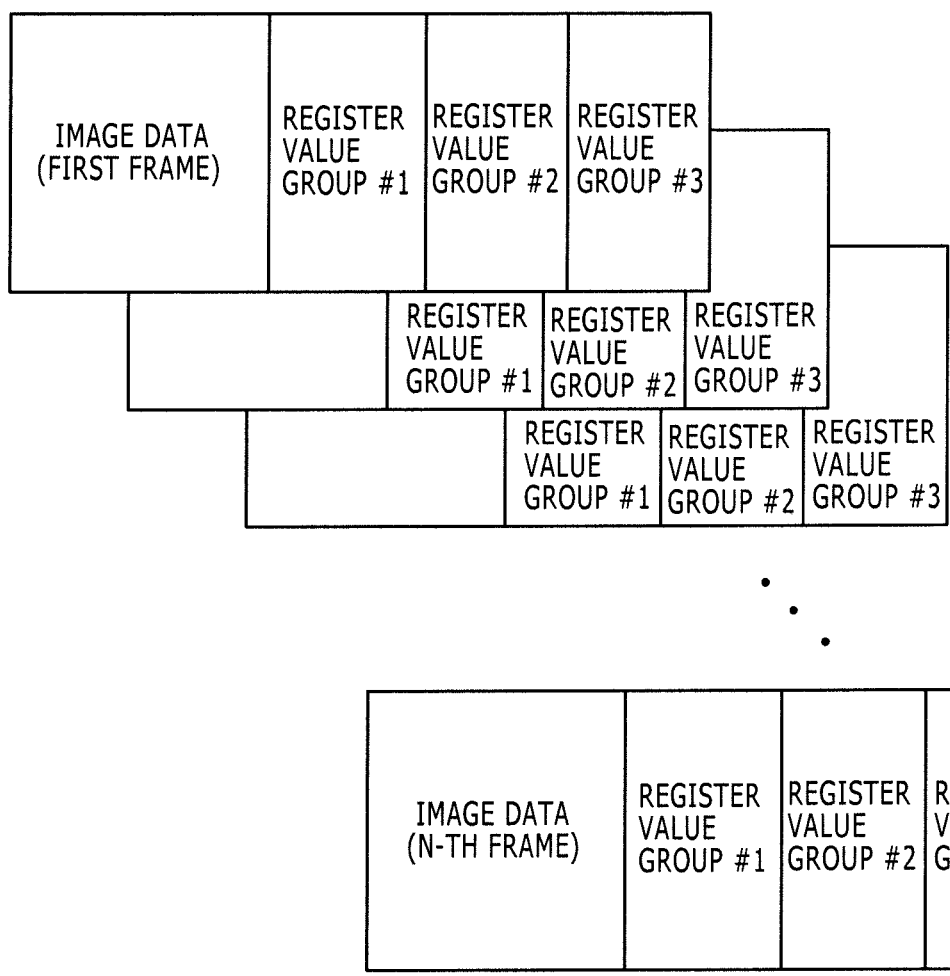
FIG. 8 is a diagram illustrating states in which N sets of image data for one frame and register value groups.

Referring to FIG. 8, there is shown a state in which a set of image data for one frame and a register value group at the time the image data for one frame was processed in the CMOS sensor 110 is stored for N frames.

After storing a set of image data for one frame and a register value group at the time the image data for one frame was processed for N frames in the CMOS sensor 110 as shown in FIG. 8, the DSP 120 can check a register value group at the time the image data for each of N frames is processed in the CMOS sensor 110, for example.

Figure 9:
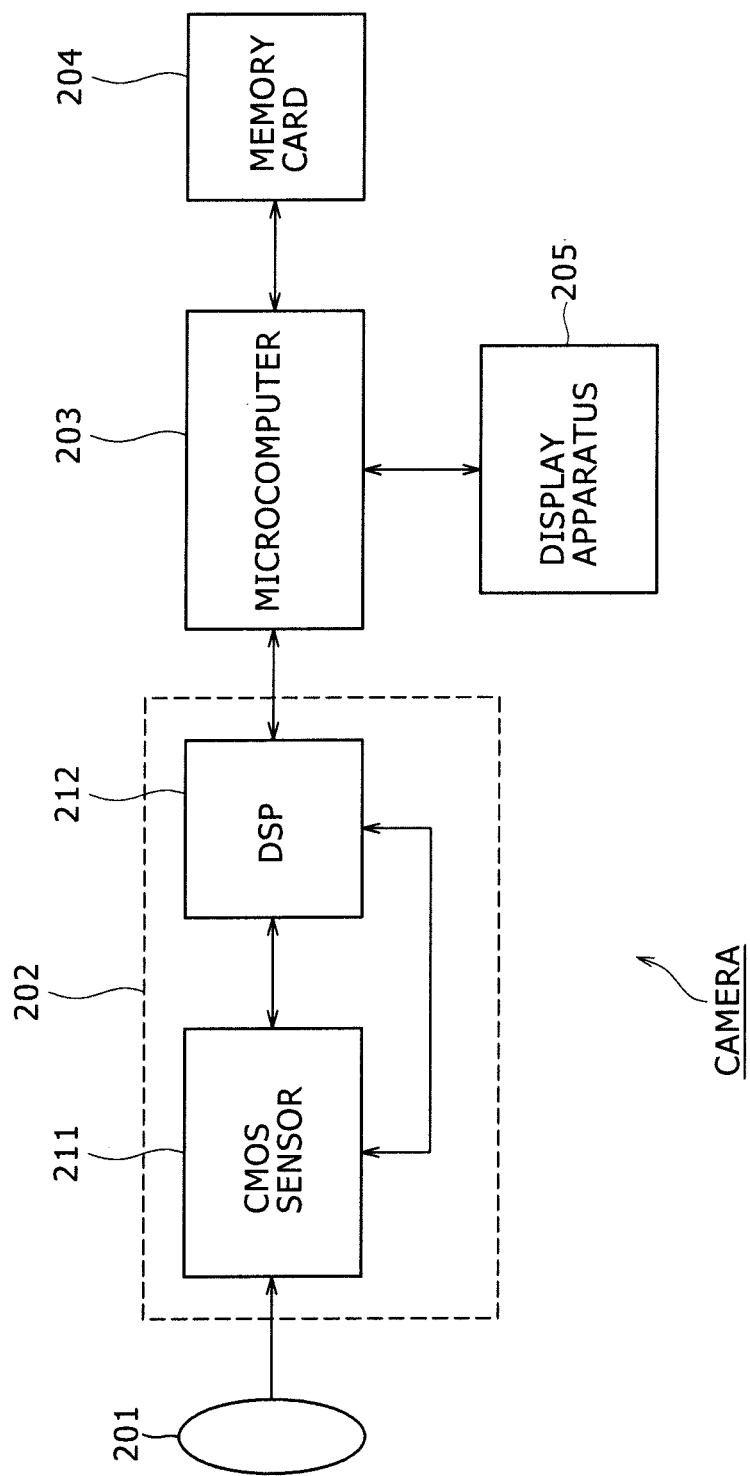
FIG. 9 is a block diagram illustrating an exemplary configuration of a camera practiced as one embodiment of the present invention.

Referring to FIG. 9, there is shown a block diagram illustrating an exemplary configuration of a camera practiced as one embodiment of the invention to which the image pickup device shown in FIG. 3 or FIG. 6 is applied.

In FIG. 9, the camera has an optical system 201, an image pickup device 202, a microcomputer 203, a memory card 204, and a display apparatus 205.

The optical system 201, composed of a lens and so on, focuses a light entering through the lens onto a CMOS sensor 211 of the image pickup device 202.

The image pickup device 202, configured in substantially the same way as the image pickup device shown in FIG. 3 or FIG. 6, has the CMOS sensor 211 and a DSP 212.

The CMOS sensor 211, composed in substantially the same manner as the CMOS sensor 110 shown in FIG. 3 or FIG. 6, photoelectrically converts the light from the optical system 201 to get image data, which is supplied to the DSP 212.

The DSP 212, composed in substantially the same manner as the DSP 120 shown in FIG. 3 or FIG. 6, receives the image data from the CMOS sensor 211 and executes necessary processing on the image data, supplying the processed image data to the microcomputer 203.

It should be noted that, between the CMOS sensor 211 and the DSP 212, register value groups are passed in substantially the same manner as with the image pickup device shown in FIG. 3 or FIG. 6.

In addition to controlling the entire camera, the microcomputer 203 supplies image data from the DSP 212 to the memory card 204 for storage. Also, the microcomputer 203 supplies image data from the DSP 212 to the display apparatus 205 based on LCD (Liquid Crystal Display) or the like to display the image data as a so-called through-the-lens image for example.

It should be noted that register value groups outputted by the CMOS sensor to the DSP 212 are supplied from the DSP 212 to the microcomputer 203 as demanded.

The microcomputer 203 controls the DSP 212 on the basis of the register value groups from the DSP 212 as demanded, for example.

The camera shown in FIG. 9 may be a still camera or a video camera. Also, the camera shown in FIG. 9 may be a camera that is installed on a mobile phone and the like, for example.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese priority Patent Application JP 2008-126140 filed in the Japan Patent Office on May 13, 2008, the entire content of which is hereby incorporated by reference.

What is claimed is:

1. An image sensor comprising:
    a pixel array configured to acquire image data by photoelectrically converting light;
    a memory element configured to store information associated with operational characteristics of said image sensor and/or the acquired image data; and
    a parallel interface configured to output said image data as a parallel output;
    wherein said parallel interface further outputs the information associated with operational characteristics of said image sensor and/or the acquired image data stored in said memory element when said image data is not being output and further comprising a serial communication interface in electrical communication with the memory element providing an alternate path for transmission of the information associated with operational characteristics of said image sensor and/or the acquired image data.

2. The image sensor according to claim 1, wherein said parallel interface outputs a register value corresponding to information associated with operational characteristics of said image sensor and/or the acquired image data in synchronization with said image data for one screen.

3. The image sensor according to claim 2, wherein said parallel interface outputs, in synchronization with said image data for one screen, the register value at the time said image data for one screen was obtained in said pixel array block.

4. The image sensor according to claim 1, wherein the information stored in the memory element includes at least one of:
    standby information indicative of whether said image sensor is in a low power dissipation mode;
    operation mode information indicative of a mode of said image sensor;
    gain information indicative of a gain of said image data;
    electronic shutter information indicative of a state of an electronic shutter; and
    OPB (OPtical Black) information indicative of a level of optical black.

5. The image sensor according to claim 1, further comprising:
    an image processing module configured to execute image processing on said image data; and
    a register group configured to store information about image processing of said image processing module;
    wherein said parallel interface outputs register value information when said image data is not being output.

6. A data output method comprising:
    outputting by a parallel interface of an image sensor, image processing information corresponding to information associated with operational characteristics of said image sensor and/or acquired image data stored in an electronic memory when image data is not being output, said image sensor having a pixel array configured to acquire said image data by photoelectrically converting light, said electronic memory storing information about processing by said image sensor, and said parallel interface configured to output said image data in parallel, and further comprising a serial communication interface in electrical communication with the memory element providing an alternate path for transmission of the information associated with operational characteristics of said image sensor and/or the acquired image data.

7. An image pickup device comprising:
    an image sensor configured to output image data; and
    a processor configured to receive said image data output from said image sensor;
    said image sensor having
        a pixel array configured to acquire said image data by photoelectrically converting light,
        an electronic memory configured to store information corresponding to information associated with operational characteristics of said image sensor and/or acquired image data, and
        a parallel interface configured to output said image data as a parallel output,
    wherein said parallel interface further outputs information stored in the electronic memory corresponding to information associated with operational characteristics of said image sensor and/or acquired image data when said image data is not being output, and further comprising a serial communication interface in electrical communication with the memory element providing an alternate path for transmission of the information associated with operational characteristics of said image sensor and/or the acquired image data.

8. The image pickup device according to claim 7, wherein said processor controls said image sensor on the basis of the information output from the electronic memory.

9. The image pickup device according to claim 8, wherein, in synchronization with said image data for one screen, said parallel interface outputs said stored information.

10. The image pickup device according to claim 7, wherein said image sensor further has
    an image processing module configured to process said image data, and
    another memory con-figured to store information about image processing by said image processing module,
    said parallel interface outputting the image processing information when said image data is not being outputted to outside.

11. A camera comprising:
    an optical system;
    an image sensor configured to output image data; and
    a processor configured to process said image data outputted from said image sensor;
    wherein said image sensor has a pixel array configured to acquire image data by photoelectrically converting light from said optical system, an electronic memory configured to store information corresponding to information associated with operational characteristics of said image sensor and/or acquired image data, and a parallel interface configured to output said image data to outside as a parallel output, said parallel interface further outputs information stored in said electronic memory corresponding to information associated with operational characteristics of said image sensor and/or acquired image data when said image data is not being output, and said processor processes said image data and further comprising a serial communication interface in electrical communication with the memory element providing an alternate path for transmission of the information associated with operational characteristics of said image sensor and/or the acquired image data.

* * * * *